Dec. 22, 1964    P. J. MAZZIOTTI    3,162,471
SEALING MEANS FOR A BALL AND SOCKET JOINT
Filed May 7, 1962    2 Sheets-Sheet 1

Dec. 22, 1964   P. J. MAZZIOTTI   3,162,471
SEALING MEANS FOR A BALL AND SOCKET JOINT
Filed May 7, 1962   2 Sheets-Sheet 2

United States Patent Office 3,162,471
Patented Dec. 22, 1964

3,162,471
SEALING MEANS FOR A BALL AND
SOCKET JOINT
Philip J. Mazziotti, Toledo, Ohio, assignor to Dana Corporation, Toledo, Ohio, a corporation of Virginia
Filed May 7, 1962, Ser. No. 192,914
4 Claims. (Cl. 287—87)

This invention relates to seals in general and more particularly to a double lip seal for use in sealing the sliding connection between the ball and socket of a ball and socket joint.

Ball and socket joints are old in the art and comprise a socket means slidably receiving a spherical ball therein; the socket being adapted for attachment to a first movable member and the ball being adapted for attachment to a second movable member whereby the movable members are connected for universal movement. Because of the universal movement which takes place between the ball and socket joint, it has been found to be exceedingly difficult to seal the junction between the same to prevent lubricant from escaping from within the socket.

Many prior art devices disclose various means for sealing the junction of the ball and socket. One such device is shown in Patent No. 1,774,679 wherein an annular sealing ring is securely carried by the socket member and slidably engages the surface of the ball. The cross sectional configuration of the sealing ring is substantially rectangular; however, due to the constant universal movement between the ball and socket member, the junction between the annular seal and the ball is subjected to constant relative movement resulting in substantial wear to the seal. Since no means are provided for accommodating the resulting wear, after relatively short periods of service use, the portion of the seal engaging the spherical ball becomes worn, resulting in a poor fit between the same so that lubricant may escape from within the socket past the junction of the seal and the spherical ball.

A seal, similar to that described above, is shown in Patent No. 2,978,886; however, here again, no means are provided to maintain the seal in engagement with the spherical surface after substantial wear has occurred between the seal and the spherical surface, especially after the seal loses its resiliency. Further, there is not a resilient connection between the seal and the socket, but merely a metal to metal fit between the seal support and the seal.

It is, therefore, an object of this invention to provide a seal for a ball and socket joint wherein the seal is adapted to resiliently engage one of the members and slidably engage the other of the members and wherein means are provided to maintain a secure sliding engagement regardless of wear of the seal or the sliding surface.

It is another object of this invention to provide a double lip seal for a ball and socket joint, whereby one lip abuttingly engages one of the joint members in a resilient nonmovable relationship and the other lip engages the other of the joint members in a sliding relationship, and wherein means are provided to maintain a secure sliding relationship between the second lip and the joint member to insure a sealing engagement even after wear or loss of seal resiliency has occurred in service.

It is yet another object of this invention to provide a double lip seal for use with a ball and socket joint, one resilient lip of the seal being securely abutted to the socket member, the other resilient lip of the seal, being in sliding engagement with the ball member of the joint, and providing resilient means in the form of an annular spring to constantly bias the second lip into sliding engagement with the ball member of the joint.

It is yet a further object of this invention to provide a centering device for a double Cardan constant velocity universal joint wherein the centering device comprises a ball and socket joint, including means for resiliently sealingly connecting the ball and socket members of the ball and socket joint, said seal being of a double lip configuration with one lip securely engaged to the socket member, which member is carried by one of the universal joint members, and the other lip of the seal slidingly engaging the ball member of the centering device, which ball is carried by another member of the universal joint, and providing means for constantly biasing said other lip into engagement with the ball member so that said second lip is adapted to engage the ball member even after wear or loss of the seal resiliency has occurred.

Still another object of this invention is to provide a double lip seal as above defined which may be easily and quickly assembled in operating position.

Further and other objects of this invention will become apparent upon a consideration of the specification when taken in conjunction with the following drawings wherein.

Figure 1:
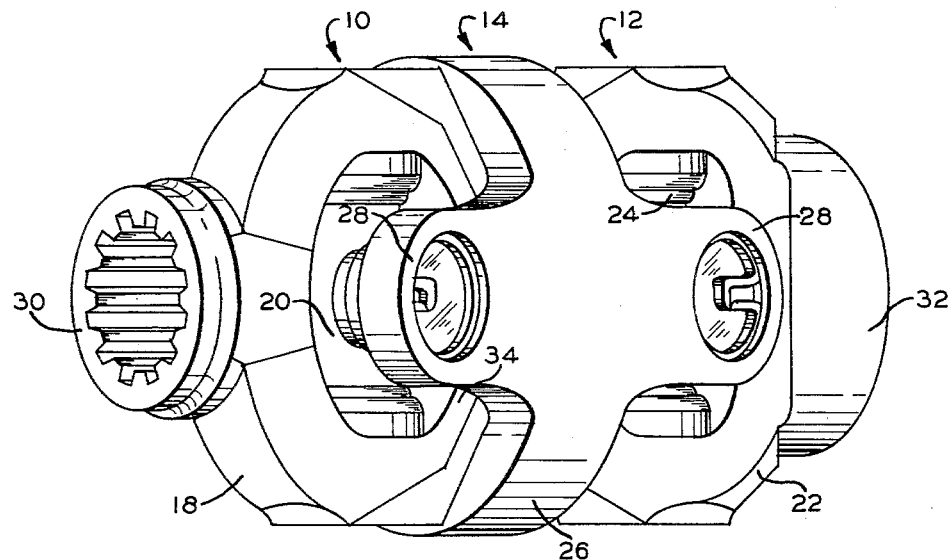
FIG. 1 is a perspective view of a constant velocity universal joint embodying this invention.
Figure 2:
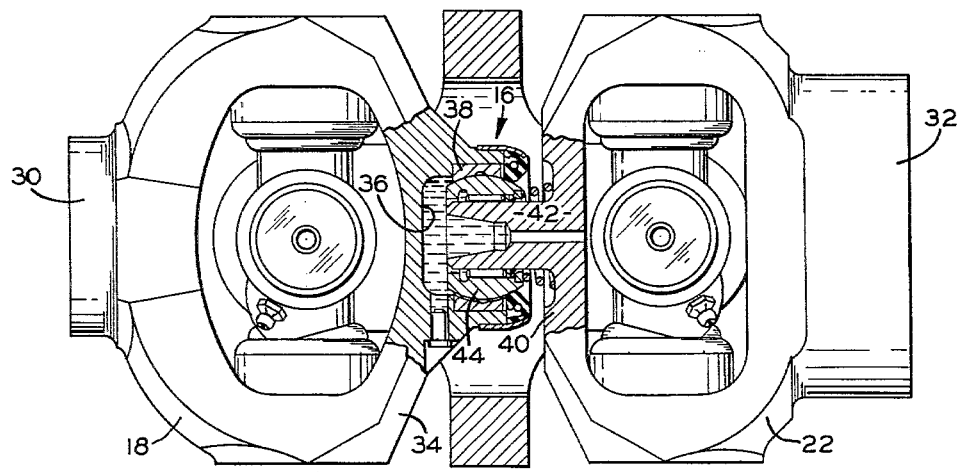
FIG. 2 is a side elevational view of the joint of FIG. 1 with portions cut away so that the ball and socket centering device is apparent.

Referring more particularly to the drawings, a pair of opposed universal joint assemblies 10 and 12 are operably connected by an intermediate motion or torque transmitting H-shaped member 14, and a centering assembly 16 for positioning corresponding members of the assemblies relative to each other. The centering assembly 16 cooperates with corresponding members of the two joint assemblies and causes these members to always assume the same angular position relative to an oscillation center of the centering assembly when a flexing of the universal joint structure takes place.

The universal joint assembly 10 comprises a yoke 18 and a cross 20. The universal joint assembly 12 comprises similar yoke and cross members 22 and 24. Each of these yokes 18 and 22 has spaced arms carrying suitable bearings which receive oppositely extending trunnions of the crosses 20 and 24 respectively.

The intermediate motion transmitting H-shaped member 14 takes the form of an annulus 26 having two pairs of ears 28 extending in opposite directions axially of the structure and spaced 180° apart on the annulus. Suitable bearings are provided in the ears 28 for receiving a second pair of oppositely extending trunnions of each cross 20 and 24. The second pair of oppositely extending trunnions is disposed at right angles to the axis of the trunnions received in the yokes 18 and 22. From the arrangement which is illustrated in the drawings and which has just been described, it is apparent that the intermediate motion transmitting member 14 is a double yoke member common to and connecting the joint assemblies 10 and 12. Moreover, from the foregoing it is understood that the crosses 20 and 24 are trunnioned or swivelled in the yokes 18 and 22 and connect the same with the intermediate motion transmitting member 14.

The yoke 18 of the joint assembly 10 is provided with a splined sleeve extension 30 for connection with a power shaft such as a shaft of a motor vehicle transmission. The yoke 22 of joint assembly 12 may also be provided with a sleeve extension 32 for connection with a power shaft, such as a propeller shaft or axle shaft of a motor vehicle. The unitary yoke and splined sleeve construction for connecting the joint assemblies to respective power shafts is merely illustrative. Other constructions, such as a two piece yoke having bolted connecting means, may also be used.

Figure 3:
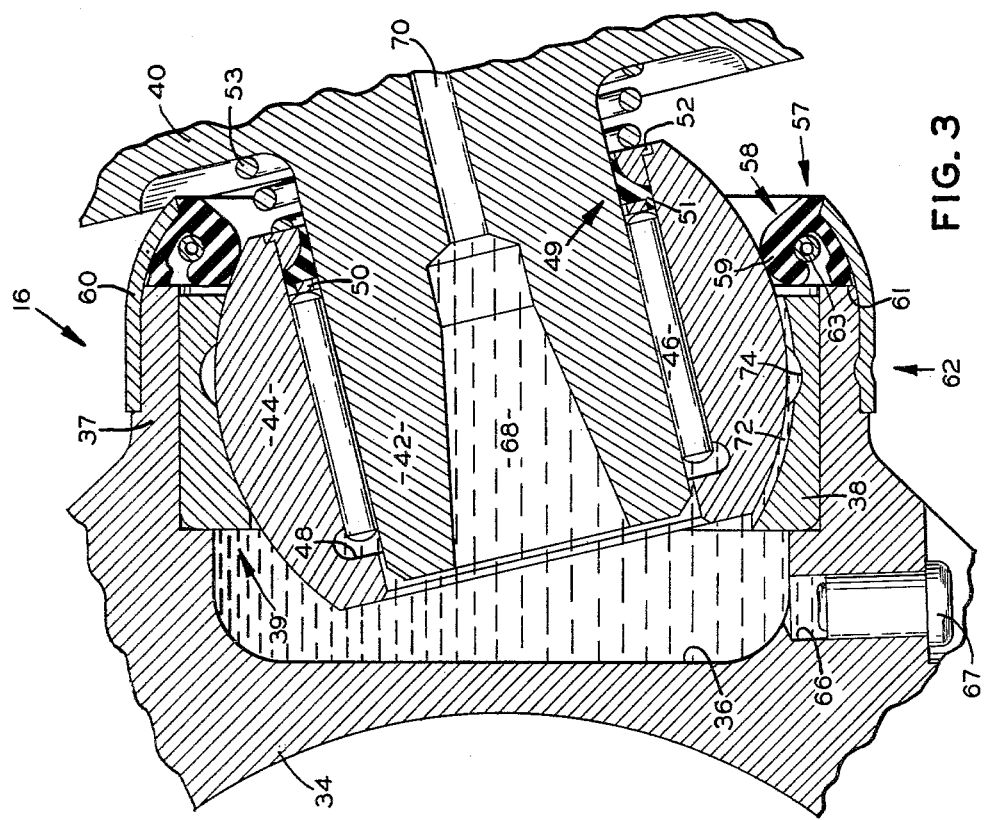
FIG. 3 is an enlarged view in section of the centering device of this invention disclosing the ball and socket joint.

To provide the joint assemblies 10 and 12 with the centering assembly or positioning means 16, a bridge extension or web 34 integrally connects the arms of yoke 18. As best shown in FIG. 3 the axially projecting medial portion of the web 34 is enlarged and provided with a lubricant reservoir which takes the form of a recess 36 having an opening at the outer end thereof. The reservoir 36 is surrounded by an axially projecting wall 37 which has an annular insert 38 fitted therein adjacent the open end thereof, which insert protrudes radially slightly into the reservoir so that the wall 37 of the reservoir 36 and the insert 38 combine to form the socket means 39. The insert 38 may be formed integrally with the wall 37; however, for ease of machining and assembly, a two piece construction as shown is more desirable.

Another bridge extension or web 40 integrally connects the arms of yoke 22. The medial portion of web 40 has a cylindrical stem or projection 42 extending axially outwardly therefrom and into the socket opening of the reservoir 36. A spherical ball element 44, having the ends thereof truncated, is rotatable and axially slidable on the cylindrical stem 42. Interposed between the ball element 44 and the stem 42 are a plurality of needle bearings 46 which facilitate relative movement of the ball and stem. The ball element 44 is counterbored to accommodate the bearings 46 and an annular shoulder 48 is formed therein to limit axial movement of the bearings in one direction. An annular sealing and biasing means, shown generally at 49 is disposed about the stem 42 and engages the web 40 and the ball element 44. More particularly, an annular ring 50 is disposed in the end of the ball member 44 opposite the shoulder 48 to abut the needle bearings 46 and limit the outward axial movement thereof. The ring 50 is abutted at its outer side by a resilient sealing ring 51, which ring is molded integrally with an annular abutment ring 52. The sealing ring 51 abuttingly engages the stem 42 and the central opening of the ball element 44 and prevents the escape of lubricant therebetween. The annular abutment ring 52 engages the outer truncated end of the ball 44 and urges the same into the socket 39 in response to the bias of an annular compressive spring 53 which spring is compressed between the abutment ring 52 and the web 40.

Means is also provided to seal external leakage and prevent entry of foreign matter between the ball member 44 and the socket 39. More particularly, an annular sealing means shown generally at 57, including a resilient sealing member 58 made from rubber or rubber like material and having a substantially U-shaped cross section and a cup portion 60, is secured about the wall 37 of the socket means 39 by the cup 60 which, after being pressed on the wall 37, is held in place by a portion thereof shown generally at 62 being deformed into the outer diameter of the wall 37. The resilient sealing member 58 has a portion, or lip, 59 thereof sealingly engaging the outer cylindrical surface of the ball member 44 in a sliding relationship, and a second portion, or lip, 61 sealingly engaging the outer end of the wall 37 of the socket means 39 and held compressed in abutting relationship relative thereto by means of the cup 60. An annular tension garter spring 63 is disposed within the U-shaped member 58 and abuttingly engages the inner portion of the lip 59 thereby constantly biasing the same into sliding engagement with the ball 44 so that wear in the location of the engagement or loss of fit due to loss of resiliency of the seal 58 or due to other causes, will not result in loss of engagement between the lip 59 and the ball 44.

Figure 4:
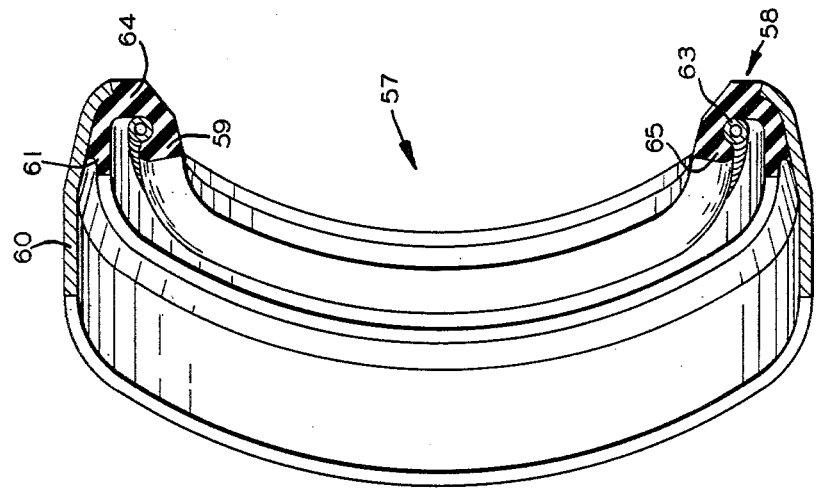
FIG. 4 is a perspective view partially in section of the sealing means shown in FIG. 3.

Referring to FIG. 4 where the sealing means 57 is shown in greater detail, the preferred mode of manufacturing is to prepare the cup 60 by stamping or the like and molding the seal 58 integrally therewith. This integral moulded construction is most desirable, for in response to centrifugal force, there is a great tendency for the lubricant in the seal area to move outwardly. If any lubricant should per chance leak past the engagement location of the lip 61 and the wall 37, it will be contained by the cup 60 and restrained from moving further outwardly, since the cup 60 and seal 58 are bonded in a complete sealing relationship and the cup 60 is securely engaged to the wall 37 by being pressed thereon. The portions or lips, 59 and 61 of the seal 58 are of annular form and radially spaced and joined at their outer ends by an annular interconnecting portion, or wall, 64. The garter spring 63 is disposed within the concave opening defined by the lips 59 and 61 and the wall 64 and maintained in this position by an edge 65 projecting from the lip 59 and by the spring's compressive engagement with the lip 59.

For supplying lubricant to the sliding or bearing parts of the centering assembly 16, a lubricant supply passage 66 is provided in the web 34. An externally accessible supply fitting 67 is disposed in one end of the passage 66 and the other end of the passage 66 communicates with the reservoir 36. To facilitate lubrication of the centering assembly 16 a tapered relief passage 68 is provided in the stem 42. This passage communicates with the lubricant reservoir 36 at the outer end of the stem 42 and with a duct 70 in the web 40 of the yoke 22 at the base of stem 42. The duct 70 extends completely through the web 40 and communicates with the atmosphere. The relief passage 68 and duct 70 permit the escape of air from the reservoir 36 as lubricant is forced thereinto, and further the appearance of lubricant at the outer end of duct 70 will indicate to the operator that the centering assembly 16 has received sufficient lubricant. However, as is well known in the art, the reservoir may be filled with lubricant upon assembly and sealed for life, thus omitting the lubricant supply passage 66 and the relief means passage 68 and duct 70.

Means are provided to relieve any pressure build-up at the location of the seal 58 and insure that the pressure at the seal location and within the reservoir 36 is equal. More particularly, a plurality of axially extending passage means in the form of grooves, one of which is shown at 72, are provided on the inner spherical surface of the insert 38 of the socket means 39. By means of the grooves 72, the seal 58 and the reservoir 36 are substantially constantly connected so that the pressure level therebetween is effectively equalized and no build-up of pressure is present at the seal 58 to force lubricant past the same.

From the foregoing it is apparent that a seal for a ball and socket joint assembly has been provided wherein the seal is adapted to securely engage one of the members and slidably engage the other of the members and including means to maintain the sliding engagement secure; wherein the seal is of a double lip type with one lip abuttingly engaging one of the joint members in a nonmovable relationship and the other lip engages the other of the joint members in a sliding relationship and including means maintaining the sliding relationship of a constant nature; wherein a ball and socket joint is disposed in a double Cardan constant velocity universal joint and utilized as a centering means therefor and includes sealing means for sealingly connecting the ball and socket members which means is of a double lip configuration with one lip constantly biased into engagement with one of the members whereby a constant sliding engagement is maintained therebetween.

While only a single embodiment of this invention has been shown and described, it is apparent that there may be many changes in structure and operation without departing from the scope of this invention as defined by the appended claims.

What is claimed is:

1. The combination with a two-piece socket member including an outer portion having an aperture therein and an annular portion pressed therein and having a central opening adapted as a socket, said member defining a closed end and an open end and having a ball member slidably disposed in said socket and adapted for universal movement relative thereto, of an annular sealing means for sealing the space between the open end of said socket member and said ball including a resilient sealing member and a cup shaped securing portion, said sealing member being of U-shape in cross section and comprising a first and a second integral annular lip portion, said securing means being bonded integrally to said sealing means adjacent said first lip portion and being pressed about the open end of said socket member and secured thereto thereby securing said first lip portion in abutting relationship with said outer portion adjacent the open end thereof, said second lip portion being spaced radially inwardly from said first lip portion and slidably engaging said ball member and adapted for universal movement relative to the latter, and a garter spring positioned between said first and second lip portions and biasing said second lip portion into engagement with said ball member whereby said ball and socket members are effectively sealed.

2. A centering device for a double Cardan universal joint comprising in combination, a first universal joint member having an axially extending projection thereon which projection is provided with an axially extending central aperture therein closed at its inward end and open at its outward end, an annular sleeve pressed in said aperture and having a central opening, the inner surface of the opening in said sleeve being adapted as a socket means, a second universal joint member disposed in opposed relationship relative to said first universal joint member and having a ball means extending axially therefrom into the aperture in said projection and slidably engaging said socket means, the portion of the aperture in said projection inwardly of the engagements of said ball and socket means defining a lubricant reservoir, and a sealing means for said centering device adapted to sealingly interconnect the outer end of said projection, said sleeve and said ball means to prevent the escape of lubricant from said reservoir past the same, said sealing means including an annular resilient sealing member and a cup-shaped securing portion, said sealing member being of U-shaped configuration in cross section and comprising first and second integral lip portions, said securing means being bonded integrally with said first lip portion and being pressed onto said projection and secured thereto and compressively engaging said first lip portion with the end of said projection, said second lip portion being spaced radially inwardly from said first lip portion and slidably engaging said ball means, and a garter spring positioned between said first and second lip portions and biasing said second lip portion into engagement with said ball means whereby said ball means and said seal member are secured in a sliding sealing relationship.

3. A centering device for a double Cardan universal joint comprising in combination, a first universal joint member having a first axially extending projection thereon which projection is provided with an axially extending central aperture therein closed at its inward end and open at its outward end, an annular sleeve pressed in said aperture and having a central opening, the inner surface of the opening in said sleeve being adapted as a socket means, a second universal joint member disposed in opposed relationship relative to said first universal joint member and having a second projection extending axially therefrom into the opening in said sleeve, a truncated ball means carried by said second projection and rotatably and axially movable relative thereto, said ball means being disposed in the opening in said sleeve and slidably engaging said socket means, the portion of the aperture in said first projection inwardly of the engagement of said ball and socket means defining a lubricant reservoir, a first sealing means adapted to sealingly engage said ball means and said second projection to prevent the escape of lubricant therebetween, and a second sealing means for said centering device adapted to sealingly interconnect the outer end of said first projection, said sleeve and said ball means to prevent the escape of lubricant past the same, said second sealing means including an annular resilient sealing member and a securing cup-shaped portion, said sealing member being of U-shaped configuration in cross section and comprising first and second integral lip portions, said securing means being bonded integrally with said first lip portion and being pressed onto said projection and secured thereto and compressively engaging said first lip portion to the end of said projection, said second lip portion being spaced radially inwardly from said first lip portion and connected thereto by a wall portion depending from said first lip portion, said first and second lip portions extending substantially axially from said depending wall portion toward said lubricant reservoir, said second lip portion slidingly engaging said ball member and permitting universal movement therebetween, and a garter spring positioned between said first and second lip portions and biasing said second lip portion into engagement with said ball member whereby said ball member and said seal are secured in a sliding sealing relationship.

4. The combination with a socket member having a ball member slidably disposed therein and adapted for universal pivotal movement relative thereto, of an annular sealing means for said ball and socket members comprising integral first and second resilient annular portions and a securing portion, said first resilient portion being disposed in abutting engagement with said socket member, said second resilient portion being in sliding engagement with said ball member and being adapted for universal pivotal movement relative thereto, said securing portion being formed of first and second integral parts, said first part engaging said first resilient portion and securely positioning the same in abutting sealing engagement with said socket member, said second part extending from said first part and spaced from said first resilient portion and surrounding at least a portion of the periphery of said socket member and fixedly attached thereto in a securing relationship, and means biasing said second resilient portion into engagement with said ball member whereby said second resilient portion and said ball member are in constant sliding engagement.

References Cited in the file of this patent

UNITED STATES PATENTS

| | | |
|---|---|---|
| 2,426,701 | Miller | Sept. 2, 1947 |
| 2,830,858 | Moorman et al. | Apr. 15, 1958 |
| 2,926,938 | Ratti | Mar. 1, 1960 |
| 2,927,808 | Rosenberger | Mar. 8, 1960 |
| 2,947,158 | King | Aug. 2, 1960 |
| 2,978,886 | Margvis | Apr. 11, 1961 |
| 2,988,904 | Mazziotti | June 20, 1961 |
| 3,095,715 | Stokely | July 2, 1963 |